United States Patent [19]

Grosskopf

[11] 3,967,053

[45] June 29, 1976

[54] METHOD AND MEANS FOR ELECTRONIC IMAGE ANALYSIS WITHIN A RASTER-SCANNED FIELD

[75] Inventor: Rudolf Grosskopf, Koenigsbronn, Germany

[73] Assignee: Carl Zeiss-Stiftung, Wurttemberg, Germany

[22] Filed: Oct. 30, 1974

[21] Appl. No.: 519,202

[30] Foreign Application Priority Data

Nov. 2, 1973 Germany ........................... 2354769

[52] U.S. Cl. ........................... 178/6.8; 178/DIG. 36; 235/92 PC

[51] Int. Cl.$^2$ ........................................... H04N 7/18

[58] Field of Search ....................... 178/6.8, DIG. 36; 235/92 PC, 92 MP

[56] References Cited

UNITED STATES PATENTS

| | | | |
|---|---|---|---|
| 3,720,812 | 3/1973 | Downs | 235/92 PC |
| 3,733,433 | 5/1973 | Fisher | 178/6.8 |
| 3,751,585 | 8/1973 | Fisher | 178/6.8 |
| 3,805,035 | 4/1974 | Serra | 178/DIG. 36 |

*Primary Examiner*—Howard W. Britton
*Attorney, Agent, or Firm*—Sandoe, Hopgood and Calimafde

[57] ABSTRACT

In raster-scan of a given electronically imaged field, a predetermined digital value is assigned to each raster element. A raster element scanned for the first time, within the boundaries of an object to be evaluated, is projected in at least one preselected direction upon raster elements of consecutive raster lines, thereby changing its digital value in each consecutive line scan by one digit position until said predetermined value has become displaced to a preselected guide value. All raster elements which after scanning are associated with said preselected guide value define an object which is to be evaluated.

12 Claims, 10 Drawing Figures

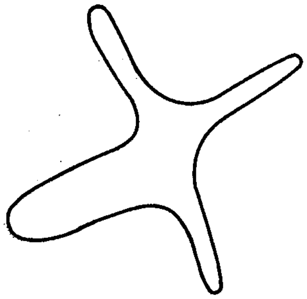
Fig.5a
Directional Sense of First Length Discrimination
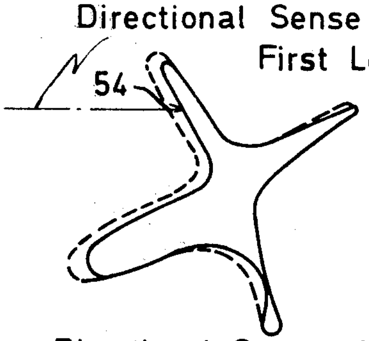
Fig.5b
Directional Sense of Second Length Discrimination
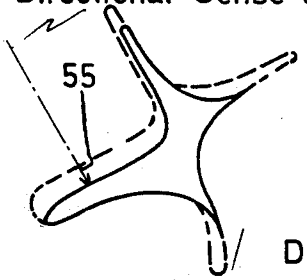
Fig.5c
Directional Sense of Third Length Discrimination
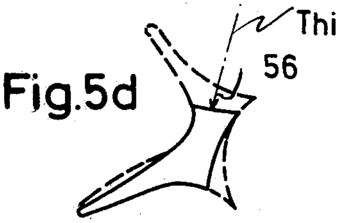
Fig.5d
Fig.5e

METHOD AND MEANS FOR ELECTRONIC IMAGE ANALYSIS WITHIN A RASTER-SCANNED FIELD

The present invention relates to a method and means for the quantitative evaluation of objects in a field which has been scanned by a raster device to produce an electrical signal, the scanning raster being subdivided by a high-frequency signal into raster elements which have a fixed position with respect to each other in successive scanning lines.

To measure the size, shape and number of discrete particles or features in a flat field, for example the viewed field of a microscope, the field is scanned in a raster pattern by means of a focused beam, for which a beam of light or an electronic beam may be used. Such scanning produces electric output signals at a receiver, such as a photocell, a photomultiplier or a television camera tube. These scan-derived signals are fed to a so-called discriminator, which, on basis of preselected criteria, selects the object or objects to be evaluated. The discriminator supplies binary signals whose length (duration), for each scan line, corresponds to the length of the chord or scanned intercept of the object. The discriminator signal is then fed to an evaluation unit which measures the values to be determined, for instance the number of objects.

Without further procedure, it is not possible to determine whether or not signals in consecutive scanning lines come from the same particle. In an effort to solve this problem, it is known to repeat all scan signals with a one-line delay and, through redundancy (the overlap criterion), to recognize signals occurring in two successive line scans as coming from one particle when the signals overlap in the scanning direction.

For a digital measurement of the surfaces of the objects evaluated, it is known to employ a generator of a high-frequency voltage, synchronized with the movement of the scanning beam. This generator then supplies a voltage which divides the scanning raster into individual raster elements. These raster elements can lie inside or outside of an object to be evaluated. After multiplication by the size of these elements, the counted number of raster elements lying within the object provides a measure of the size of the surface of the object.

It is already known to delay the scanning signals in the scanning direction and in this way, starting from the edge of a particle, to effectively remove (in a predetermined direction and within each scanning line) a certain length of the particle, i.e., to displace the edge of the particle by a predetermined distance. However, this process, which is known as length discrimination, does not assist in reaching the desired goal in the case of particles which are characterized by irregular and random distention or are otherwise strongly broken up, namely to supply the evaluation unit with the necessary information to permit an evaluation of the particle as a whole.

Known devices for electronic picture analysis have the disadvantage that they are designed only for a few special types of measurement. Conversion to other types of measurement, such as for instance preset length in different directions, requires in each case entirely different special-purpose electronic units.

The principal object of the present invention is to provide a method for the quantitative evaluation of the objects in a field which has been scanned by a raster technqiue to develop an electric signal, which upon conversion will make it possible to measure correctly the shape, size and number of objects, including objects of complex shape.

Another object is to meet the above-stated object with a method which is additionally a valuable aid in pattern recognition.

A general object is to provide a device for implementing the foregoing objects, with relatively simple construction and with inherent capability for diversified use without great expense.

The new process employs the known technqiue of subdividing the scanning raster into raster elements which have a fixed-position relation to each other in successive scanning lines. In accordance with the invention a predetermined digital value is assigned to each raster element. A raster element scanned for the first time, within the boundaries of an object to be evaluated is projected in at least one preselected direction upon raster elements of consecutive raster lines, thereby changing its digital value in each consecutive line scan by one digit position until said predetermined value has become displaced to a preselected guide value. All raster elements which after scanning are associated with said preselected guide value define an object which is to be evaluated.

It is particularly advantageous to reduce the assigned digital value to the guide value of zero, and thus to effect a length discrimination of the objects evaluated.

In the new process, and within the limits of an object to be evaluated, the predetermined value of each raster element which is scanned for the first time is subjected to temporary storage, and the signal thereby delayed (for a preselected period of time) is changed by an increment in the next scanning line as long as the scanning beam moves in the object, this process being repeated until a predetermined guide value has been reached; all raster elements which after scanning are associated with said predetermined guide value are fed to an evaluation unit, as identification of the particular evaluated object.

The raster elements of successive scanning lines are staggered with respect to each other, the delay time of the signals being so selected that the raster elements both in succcessive even scanning lines and in successive odd scanning lines are displaced in each case by equal amounts in one direction.

In accordance with a further feature of the invention, the direction of the length discrimination can be determined in simple fashion by selection of the storage time of the predetermined values and by a well-defined incremental displacement of the raster elements in successive scanning lines. The amount of the length discrimination is determined directly by the assigned digital value and by the guide value. In this way, the new process is flexibly adaptable to various object configurations, since it permits preslection of the direction and of the extent of length discrimination. By means of this new process, an unequivocal evaluation becomes possible, even for the case of complex and strongly broken-up particles.

Apparatus for carrying out the process of the invention is selected from available components, using a generator for producing the raster frequency and a discriminator for selecting, in accordance with selectively variable criteria, the objects which are to be evaluated. Use in the invention is characterized (*a*) by decision-logic circuitry to which an assigned digital value is supplied for each raster element and which is connected with the output of the discriminator, (*b*) by a delay storage device to which the assigned digital values are fed by the decision-logic circuitry as a function of the discriminator signal and which returns said values delayed and fed back to the decision-logic circuitry, and (*c*) by an evaluation unit which is connected with the signal output of the decision-logic circuitry.

The decision-logic circuitry is replaceable or switchable so that the apparatus can be converted for different tasks by the replacement of this central assembly which determines the specific method of measurement.

The invention will be described in further detail below with reference to FIGS. 1 to 5 of the accompanying drawings in which.

Figure 3A:
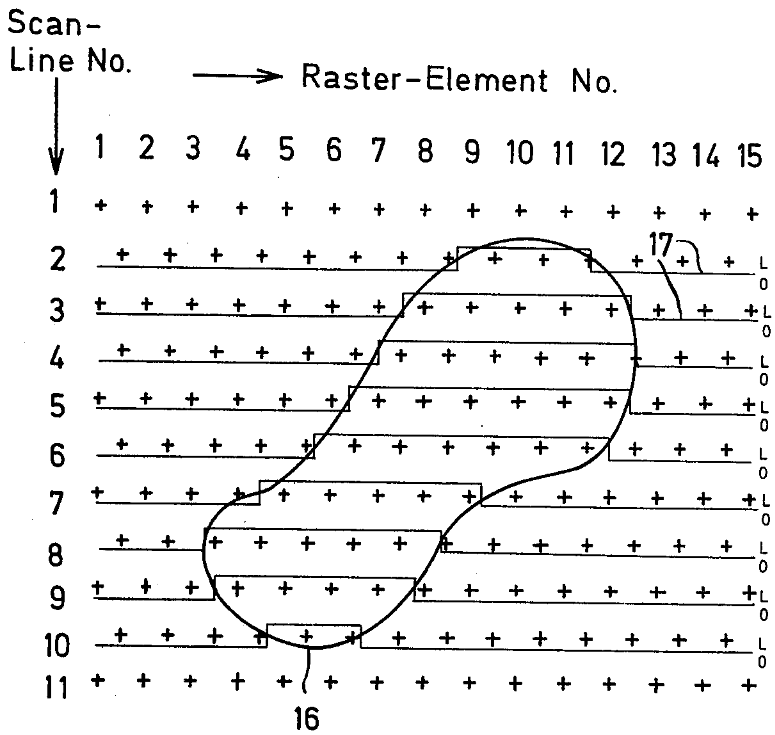
Figure 3B:
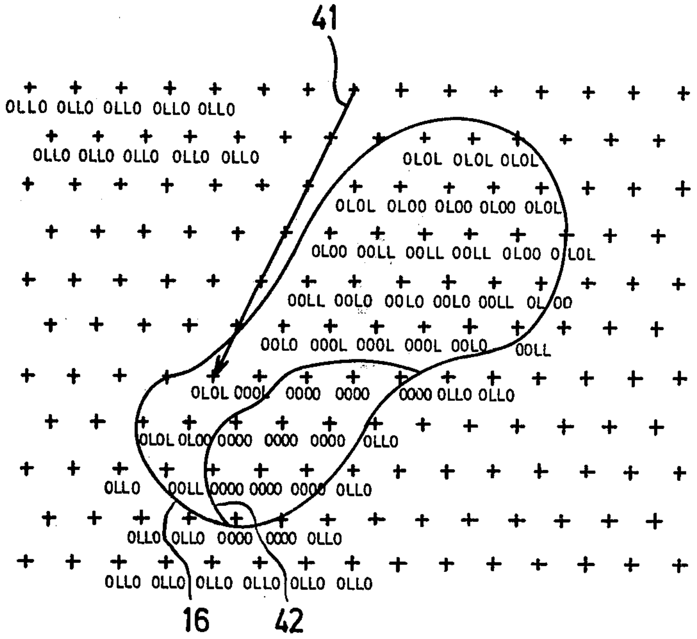
Figure 4:
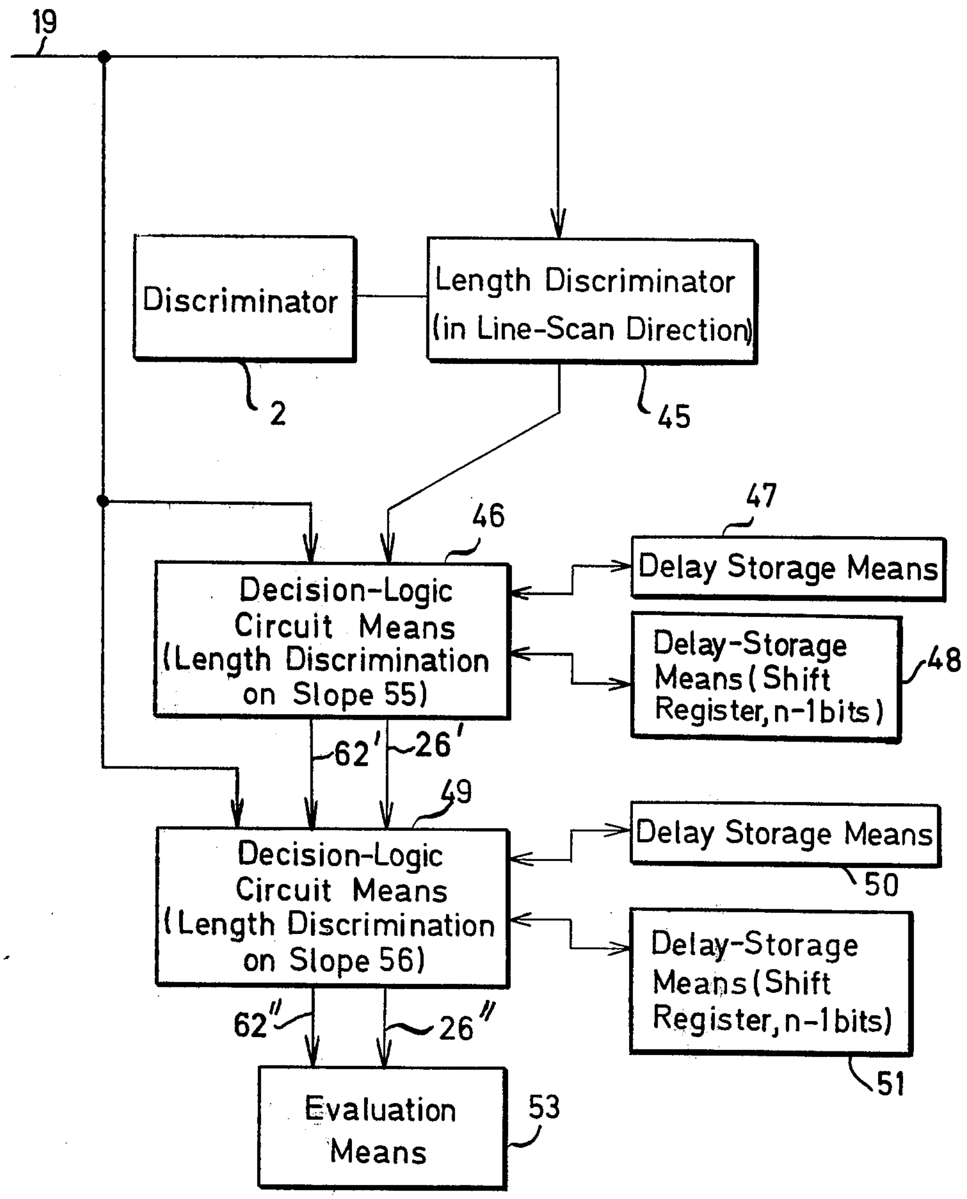

FIG. 3*a* is a simplified chart display to schematically show a corner fragment of the scanning raster as well as the discriminator signal during the scanning of a particle;

FIG. 3*b* is a display as in FIG. 3*a* and showing the particle represented in FIG. 3*a*, with specific digital value notation at each raster element, to illustrate use of an assigned digital raster-element value during an evaluation process;

FIG. 4 is a block diagram of apparatus for length discrimination in each of three different directions;

FIGS. 5*a* to 5*e* depict a particle in different stages of scanning with apparatus in accordance with FIG. 4.

Figure 1:
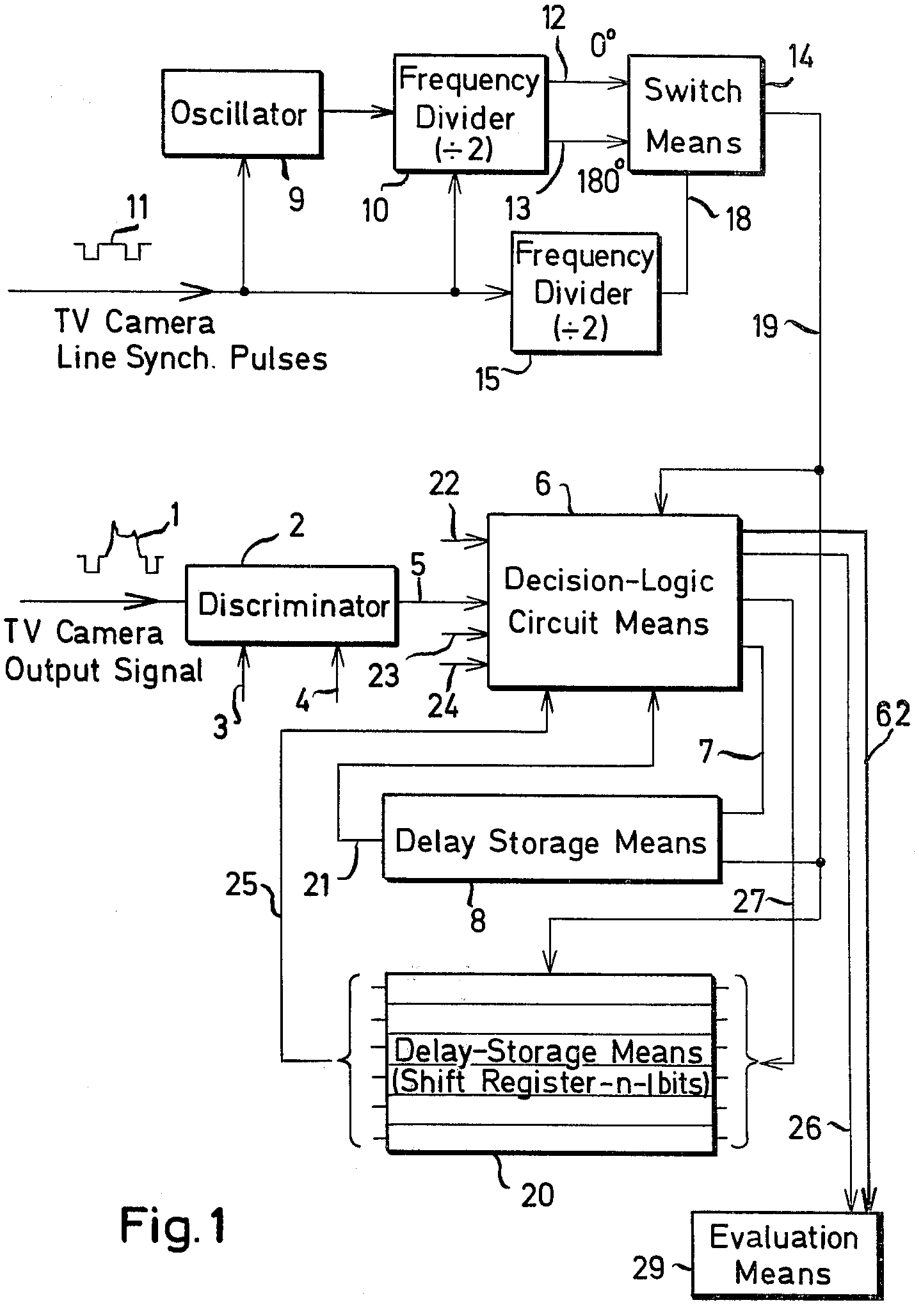
FIG. 1 is a block diagram of one embodiment of apparatus in accordance with the invention.

In FIG. 1, 1 is the composite signal which is produced during line-scanning a field by means of a television picture camera (not shown). This signal is fed to a discriminator 2 to which voltages are introduced by the lines 3 and 4, for the preselection of first and second amplitude thresholds, whereby the video portion of the signal 1 is exclusively utilized to derive clear identification of the margin intercepts of each scan line with the scanned object to be evaluated; discriminator 2 may thus include a bistable flip-flop, having a first stable state (L) for video-signal levels above a level determined at 3 but nevertheless representing less than object brightness, and having a second stable state (O) for video-signal levels above a predetermined level supplied at 4, the latter being predetermined as the maximum object brightness to be recognized for evaluation. There is thus present on line 5 a binary signal which is indicative of the presence of particles to be evaluated in the field. This signal is fed to a descision-logic circuit 6, to be more fully described in connection with FIG. 2; at the same time, this same signal continuously passes through circuit 6 and via a line 7 to a storage device which delays the picture information by a one-line period.

An oscillator 9 is employed to produce the raster elements, and for the assumed case of picture scanning in accordance with 625-line television standards, oscillator 9 may have an output-signal frequency of 16 MHz. The signal of the oscillator 9 is fed through a divider 10 which divides by two the oscillator-output frequency. Oscillator 9 and divider 10 are stopped at the end of each line by the line-synchronizing pulses 11 from the television camera, and they are started up again at the beginning of the next line. In this way, assurance is had that the raster elements of consecutive lines will have a fixed well-defined position with respect to each other, and that they will be synchronized with the line frequency.

The divider 10 supplies, via a first output line 12, pulses of frequency 8 MHz with a phase position of 0° and, via a second output line 13, pulses of the same frequency but at 180° phase displacement from those in line 12.

The two signals are fed to a switch 14. Another divider 15 operates from the line synchronizing pulses of the television camera and divides by two to produce pulses corresponding to half the line frequency. Pulses from divider 15 control the switch 14 which, for instance, permits the pulses (line 12) with the 0° phase to act for all even-number lines and the pulses (line 13) with the 180° phase to act for all odd-number lines. In this way, the raster elements of the even-number lines are displaced by half-element spacings from each other, as compared with the raster elements of the odd-number lines, all as shown in FIG. 3*a*, wherein the individual raster elements are designated in each case by a cross. Additionally, FIG. 3*a* shows the outline of a particle 16 scanned between object limits represented by lines 2 to 10 of the raster and by raster elements extending from the third raster element of line 8 to the twelfth raster element of lines 3, 4 and 5. Still further, FIG. 3*a* shows for each scan line the signal 17 supplied by the discriminator 2, the same being designated as in the L state between scan-line intercepts of the object 16 and as in the O state for the background phases of each scan line. As can readily be seen, the output of discriminator 2 is a binary signal which indicates in each scanning line whether or not the scanning beam is moving in the object particle.

The discriminator-output signal 17 is fed via line 5 to the decision-logic circuit 6, the pulse signal produced by switch 14 being fed to said logic circuit via a line 19; this pulse signal serves also to control the delay storage means 8, having an output-line connection 21 to the logic circuit 6. Also connected to the decision-logic circuit 6, via a line 25, is another delay-storage device 20. The decision-logic circuit 6 has further input lines 22, 23 and 24, to be described in connection with FIG. 2. The signal prepared in the decision logic circuit is finally fed to an evaluation unit 29 via a line 26, and via a line 62 (also to be later described in connection with FIG. 2).

The manner of operation of the apparatus shown in FIG. 1 will now be explained, with additional reference to FIGS. 2, 3*a* and 3*b*.

The operator must first select a predetermined digital raster-element value in accordance with his particular problem; his selected value is supplied via the line 22 to a "Pre-Selected Value" storage device 30. The latter is then controlled via line 19 in synchronism with the raster frequency. As long as the scanning beam does not strike any particle, a O signal passes via the line 5 to a switch 31. The latter connects the output of the "Pre-Selected Value" storage device 30 to the line 32. In this way, for each raster element, the preselected digital value (OLLO, selected here by way of example), passes via the line 27 into the delay storage means 20. The latter may be for example a shift register with $n-1$ bit capacity, where $n$ is the number of raster elements in a scan line. The signals fed to the storage 20 are therefore again available after $n-1$ bits at the input 25 of an "Actual-Value Storage" device 33. As long as the discriminator 2 supplies an O signal, this delayed signal is not treated further.

As soon as the scanning beam intercepts a particle, for instance, the particle 16 in FIG. 3*b*, an L signal passes via the line 5 to the switch 31, as can be noted from curves 17 in FIG. 3*a*. At this moment, the switch 31 establishes connection of a line 34 to a line 32, while cutting off supply of any OLLO signal from the "Pre-Selected Value" storage 30 to output line 27. At the moment of switching, there is present on the line 34 the pre-selected digital value of the raster elements of the previous line, reduced in the subtraction device 35, to the extent of a one-digit change, so that for all raster elements of the first line lying within the limits of the particle, the digital value OLOL passes via the line 32 and two delay devices 36 and 37 into the storage 20.

The two delay devices 36 and 37 are controlled via separate lines 23 and 24 and are in each case operative to delay by a period of time which corresponds to the distance between two successive raster elements. For the illustration given in FIG. 3*b*, the delay device 37 is continuously disconnected while the delay means 36 is alternately connected and disconnected from line to line, it being understood that by connecting line 23 for supply by signals in line 19, this type of operation may be achieved. In this way, the result is obtained that, for instance, the eighth raster element of line 1 in FIG. 3*b* moves to the left in the direction of the arrow 41 from line to line, in each case by one half a raster-element spacing. If the delay means 37 were in addition continuously connected, the direction of length discrimination would be shifted, for alignment which slopes from top left to bottom right.

The preselected value associated with each raster element within the boundaries of the particle 16 can be noted from FIG. 3*b*. As can be noted therefrom, the described process of reducing the selected value by a one-digit change repeats for each successive scan line until the comparator 38 finally recognizes the guide value O for certain raster elements in the sixth line of scanning the particle. Of course, it is also possible to set the comparator 38 with an appropriate bias or offset, for recognition of some other desired guide value.

It is thus seen that a predetermined digital value is associated with each raster element. As shown in FIG. 3*b*, this is the binary number OLLO which corresponds to the number 6 in decimal notation. A raster element, e.g., the element 9 in scan line 1, is projected in a preselected direction (shown by arrow 41 in FIG. 3*b*) upon raster elements of the consecutive raster lines, i.e., upon element 9 in line 2, then element 8 in line 3, element 8 in line 4, element 7 in line 5, element 7 in line 6, and so on. In each consecutive line scan the predetermined digital value (OLLO) of the first line raster element within the boundary of the object to be evaluated (element 9 in line 1) is changed by one digit position, so that the digital value in line 2 is OLOL, in line 3 OLOO, in line 4 OOLL, in line 5 OOLO, in line 6 OOOL and in line 7 OOOO. In case OOOO is the preselected guide value, displacement of the predetermined value OLLO is finished in line 7, i.e., in the seventh scan line within the boundaries of the object. As can be seen the predetermined digital value (OLLO) determines the number of scans necessary to reach the guide value and therefore the length of the distance the boundary line of the object is shifted before evaluation.

As soon as the guide value has been reached, comparator 38 creates a control signal which disconnects the subtractor 35 so that the value O enters into storage

20 within the limits of the particle, i.e., in the only remaininig object area (indicated by boundary 42 in FIG. 3*b*), said remaining area being the only are subjected to evaluation at 29. At the same time, the comparator 38 via an inverter 39 passes an L signal to the AND gate 40; at the same time an L signal is arriving via line 5, so that the L signal supplied by the discriminator 2 may now pass via line 26 to the evaluation means 29.

Figure 2:
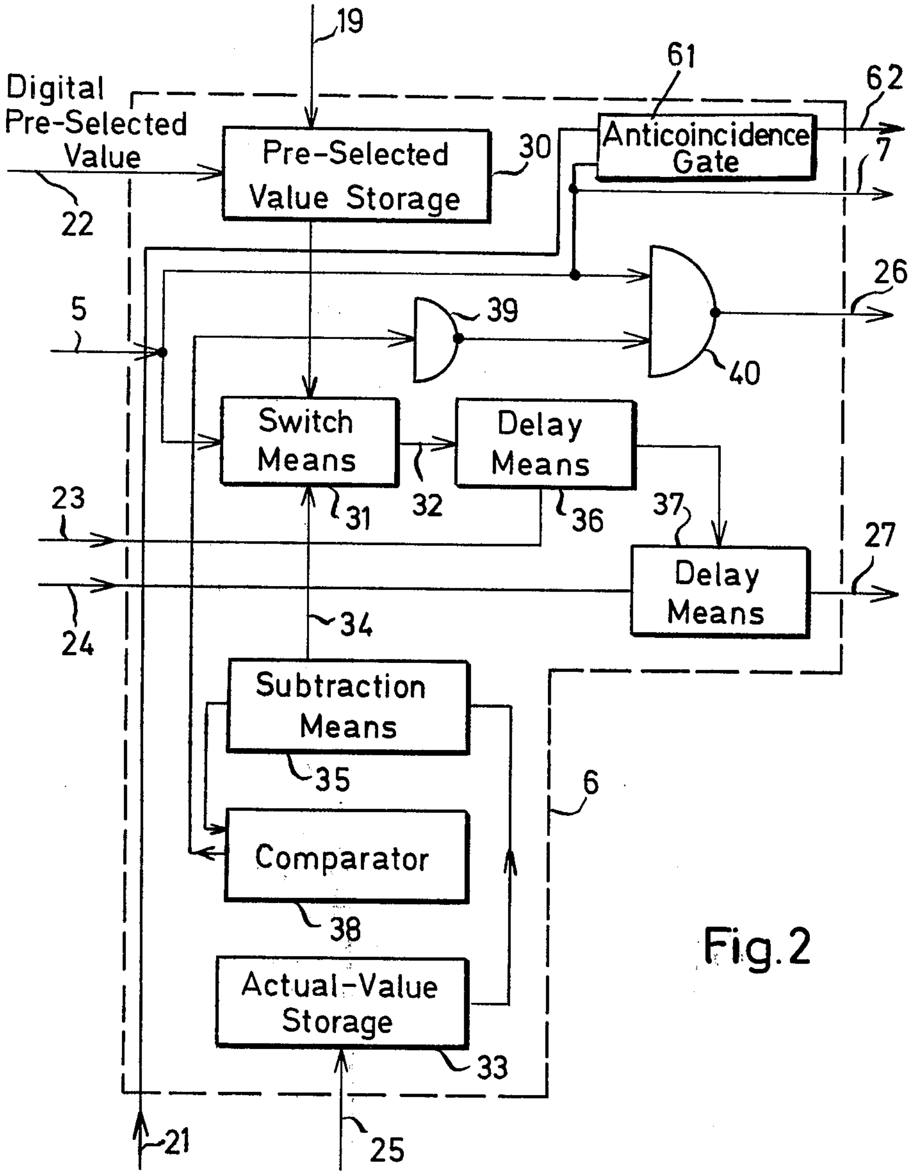
FIG. 2 is a block diagram of decision-logic circuitry contained in FIG. 1.

As can be seen from FIGS. 1 and 2, the discriminated signal is fed via the output line 7 to the input of delay storage means 8. This means delays the signal for a time corresponding to one line-scan period. Via output line 21, this delayed signal is fed to the decision-logic circuit means 6. This means contains an anticoincidence gate 61, shown in FIG. 2. Fed to this gate via line 21 are the delayed and via line 5 the undelayed discriminated signal. As long as both signals show an overlapping pulse, the gate 61 is closed. It opens and gives an impulse via output line 62 to the evaluation means 29 as soon as there is no overlap of impulses at the respective inputs of gate 61; this is the case, e.g., in line 11 of FIG. 3*a*. Therefore, as soon as the scanning beam scans line 11, there is no longer an overlap of pulses coming from line 10 and line 11, and the anticoincidence gate 61 delivers a counting pulses to evaluation means 29, thus establishing the basis for counting the one particle (16, in FIG. 3*b*). If desired, the evaluation unit will be understood to additionally include further counting means, responsive to the number of raster elements identified OOOO, thus presenting a displayed "area" evaluation of the length-discriminated region 42.

In the circuit of FIG. 4, the discriminator 2 is connected with a device 45 which serves for the length discrimination in the scan-line direction; such devices are known and need not be described in detail here. The output signal of the device 45 is fed to a decision-logic circuit 46 which is of the same construction as the desicion-logic circuit 6 of FIGS. 1 and 2, it being noted that the delay means 36–37 (see FIG. 2) of such decision-logic circuit are connected and operative, by reason of a contol pulses in lines 23 and 24, respectively. In similar fashion, the output signals from logic circuit 46 (available in lines 26' and 62', corresponding to lines 26 and 62 in FIGS. 1 and 2) are utilized as input singals to a second decision-logic circuit 49 which is also of the same construction as the decision-logic circuit 6 of FIGS. 1 and 2.

Further in connection with FIG. 4, a delay-storage means 47 and a shift-register delay 48 (corresponding to delay means 8 and 20, respectively, in FIG. 1) will be recognized in connection with logic circuit 46. Similarly, corresponding delay devices 50 and 51 cooperate with logic circuit 49. Output lines 26'' and 62'' from logic circuit 49 are connected to the evaluation means 53.

The manner of operation of the arrangement of FIG. 4 will be described in further detail with reference to FIGS. 5*a* to 5*d*. When a scanning beam scans a particle which has, for instance, a plurality of projecting contours, such as the particle shown in FIG. 5*a*, length discrimination is first of all effected in the scan-line direction at the device 45, in the direction indicated by the arrow 54 (FIG. 5*b*). The output signal of the device 45 corresponds to a particle having the shape shown in solid lines in FIG. 5*b*. This output signal is next discriminated in the decision-logic circuit 46, in the direction of the arrow 55 (FIG. 5*c*), a signal being produced which corresponds to a particle shape in accordance with the solid outline in FIG. 5*c*. Thereafter, this signal is again discriminated in the decision-logic circuit 49, in the direction of the arrow 56 (FIG. 5*d*). The signal fed to the evaluation unit 53, for example via the line 26'' may then include a succession of pulses to be counted at 53 to develop the area of the particle, having the shape as shown in FIG. 5*d*. Such a particle can be recognized (via line 62'') by the evaluation unit 53 as a discrete particle, to be counted as such.

For pattern recognition, for instance for recognition as to whether the particle is a compact particle or a fanned (as in FIG. 5*a*) particle, it may also be advantageous again to enlarge the scanned display of discriminated particle. This can be done with apparatus in accordance with FIG. 1, it being merely necessary for an inverter to be inserted in line 5. There is then obtained, for the case of the fanned particle of FIG. 5*a*, the particle picture shown in FIG. 5*e*.

On the other hand, for the case of a compact (e.g., a more circular displayed particle shape), approximately the original circular shape will be assumed even after length discrimination in different directions, and even after subsequent enlargement in these directions.

In experience to date with the described apparatus, it has been learned that a first general relation exists between the measured periphery of a given "compact" particle display versus the measured periphery of the length-discriminated and later-enlarged contour therof. This general relation is useful to permit the conclusion that the particle evaluated is of originally "compact" nature. On the other hand, it has been learned that a second and easily recognized different general relation exits between the measured periphery of a given "fanned" particle display versus the measured periphery of the length-discriminated and later-enlarged contour thereof. A measured determination of the existence of substantially the first or of substantially the second general relation thus indicates the nature of the original displayed particle shape.

The described apparatus is also suitable for making the peripheral measurement of a given particle. For this purpose, the magnitude of length discrimintion, for the respective directions shown in FIGS. 5*b* to 5*d*, is selected to be small in relation to the size of the particle in the discriminating direction involved. By comparing a particle-area measurement prior to discrimination with a particle-area measurement after length discrimination, one may obtain a difference which is proportional to the original periphery of the particle.

What is claimed is:

1. The method of electronic-image analysis within a field of raster-scanned subject matter, comprising the steps of subdividing the scanning raster by means of a high-frequency signal into raster elements which have a fixed position with respect to each other in successive scanning lines, assigning a predetermined digital value to each of said raster elements, projecting each raster lying within the boundaries of an object within said scanned field in at least one preselected direction upon raster elements of the consecutive raster lines, changing during said projection the digital value of the raster elements in each consecutive line scan by one digit position, preselecting a guide value for said projected raster elements, repeating the projection of said elements in successive scanning cycles until their predetermined digital value has become displaced to said preselected value, and defining an object which is to be evaluated only by raster elements which after scanning are associated with said preselected guide value.

2. The method of claim 1, in which the preselected guide value is selected as zero.

3. The method of claim 1, in which said projection of raster elements lying within the boundaries of an object upon raster elements of succceeding consecutive raster lines comprises the steps of producing a digital-value signal for each raster element, delaying said digital-value signal of each raster element within one line for a period corresponding to one line-scan transit time plus the scan transit time between two successive raster elements within one line, delaying said digital-value signal of each raster element within another line for one line-scan transit time, said one and other lines being in repetitive alternating succession, changing said digital-value signal by one digit after each of said delaying steps, and substituting said delayed and changed digital values in place of the digital values of the raster elements in the next-succeeding consecutive line.

4. The method of claim 1, in which said projection of raster elements lying within the boundaries of an object upon raster elements of succeeding consecutive raster lines comprises the steps of producing a digital-value signal for each raster element, delaying said digital-value signal of each raster element within one line for a period corresponding to one line-scan transit time minus the scan transit time between two successive raster elements within one line, delaying said digital-value signal of each raster element within another line for one line-scan transit time, said one and other lines being in repetitive alternating succession, changing said digital-value signal by one digit after each of said delaying steps, and substituting said delayed and changed digital values in place of the digital values of the raster elements in the next-succeeding consecutive line.

5. The method of claim 1, in which the high-frequency signal is subjected to a predetermined phase shift, and in which the phase-shifted signal is utilized in line-interlace with the original high-frequency singal to establish first fixed raster-element positions in one line in offset relation to second fixed raster-element positions in an adjacent line, the direction of offset being that of line scanning.

6. The method of claim 5, in which the phase shift is substantially 180°.

7. The method of claim 5, in which said projection upon raster elements of consecutive raster lines involves a predetermined delay between consecutive lines wherein the delay is applied only when a given one of said first and second raster-element characterized lines precedes the other of said first and second lines whereby the inclined slope of the length discrimination is uniquely determined.

8. Apparatus for electronic-image analysis within a field of raster-scanned subject matter, wherein TV-scan video and line-synchronizing signals are available from raster-scanning of the subject matter, comprising a high frequency generator of frequency greater than the line frequency of TV-scanning, said generator having a synchronizing input for synchronization with input line-synchronizing signals, whereby for each scanning line a plurality of precisely spaced raster elements may be identified through output oscillations of said generator, a discriminator having an input for supply with the TV-scanned video signal, said discriminator having upper and lower thresholds between which a predetermined range of video-signal level may be selected for evaluation, decision-logic circuit means connected to said discriminator to receive signals passed between said thresholds, a synchronizing control connection from said generator to said logic-circuit means; said logic-circuit means including selectively operable means for storing a preselected digital value, switch means having a control connection to the discriminator output and having a first state reflecting presence of the scanned object and a second state reflecting absence of the scanned object, said logic-circuit means having an output characterized by said preselected digital value when said switch is in said second state; and $n-1$ bit delay-storage device having an input connected to said logic-circuit output and having a delay output connection, subtraction means connected to said delay output connection for subtracting one digit for each raster-digit signal, as long as said switch means is in said first state, the output of said subtraction means being connected to said logic-circuit output when said switch is in said first state, a comparator preset for a guide-value raster-digit signal beyond which further subtraction is to be limited, said comparator producing an output signal upon recognition of raster-digit reduction to said guide value, means including a gate having an input connection to the output of said comparator, said gate providing an output singal for particle evaluation, and an input control connection to said gate from the output of said discriminator.

9. Apparatus according to claim 8, in which said comparator is preset for a guide value of zero.

10. Apparatus according to claim 8, in which said decision-logic circuit means is but one of a plurality of series-connected similar descision-logic circuit means.

11. Apparatus according to claim 8, in which first and second separate delay devices are series-connected between said switch means and said logic-circuit output, each of said delay devices having a delay corresponding to line-scan transit time between adjacent raster elements in a given scan line, and selectively operable means associated with said delay devices for determining whether or not their respective delay functions are to be employed.

12. Apparatus according to claim 11, in which said selectively operable means includes a control connection from the output of said generator means to one of said delay devices, whereby the mangitude of delay introduced for odd scan lines is a predetermined fraction of the delay introduced for even scan lines.

* * * * *